Patented May 28, 1940

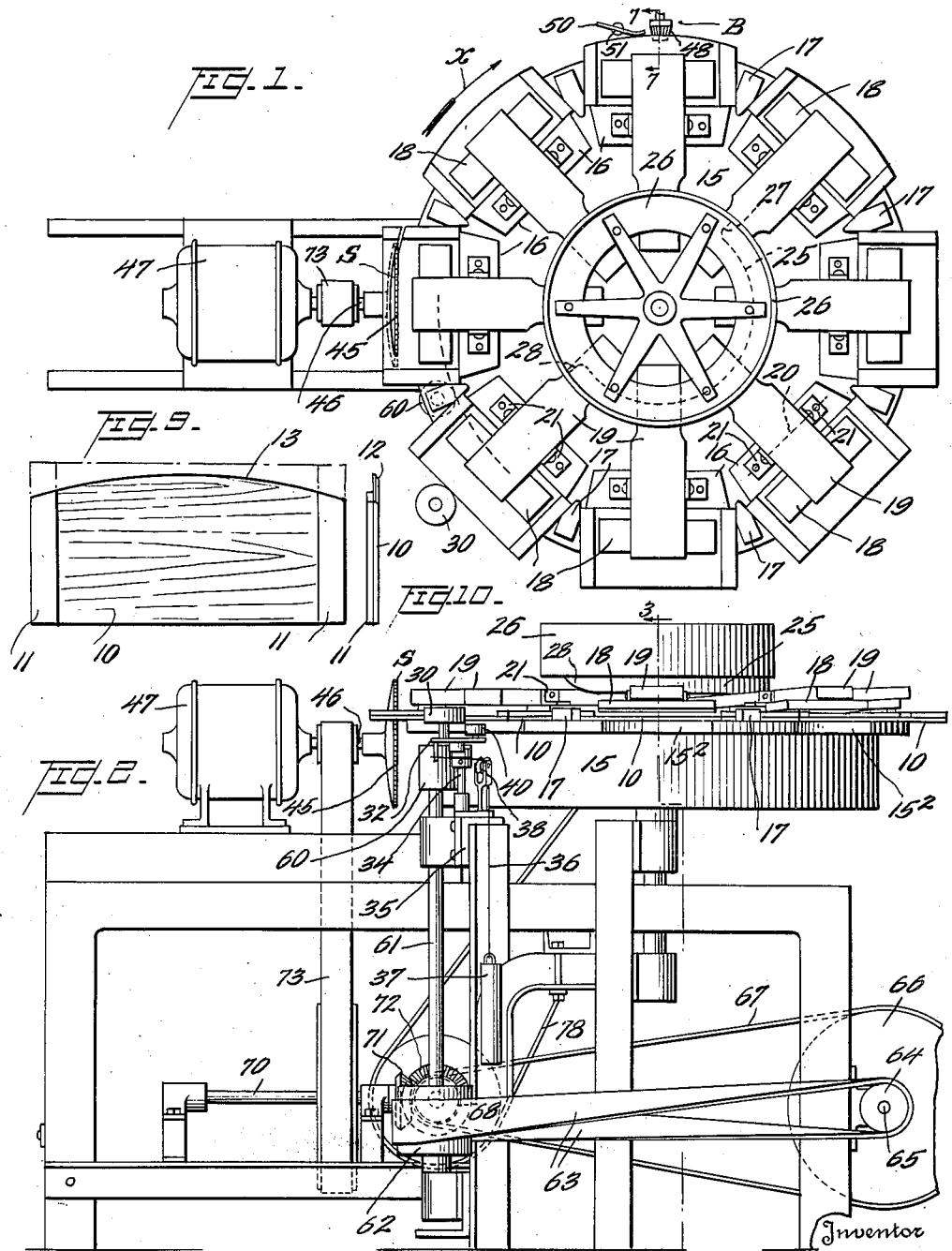

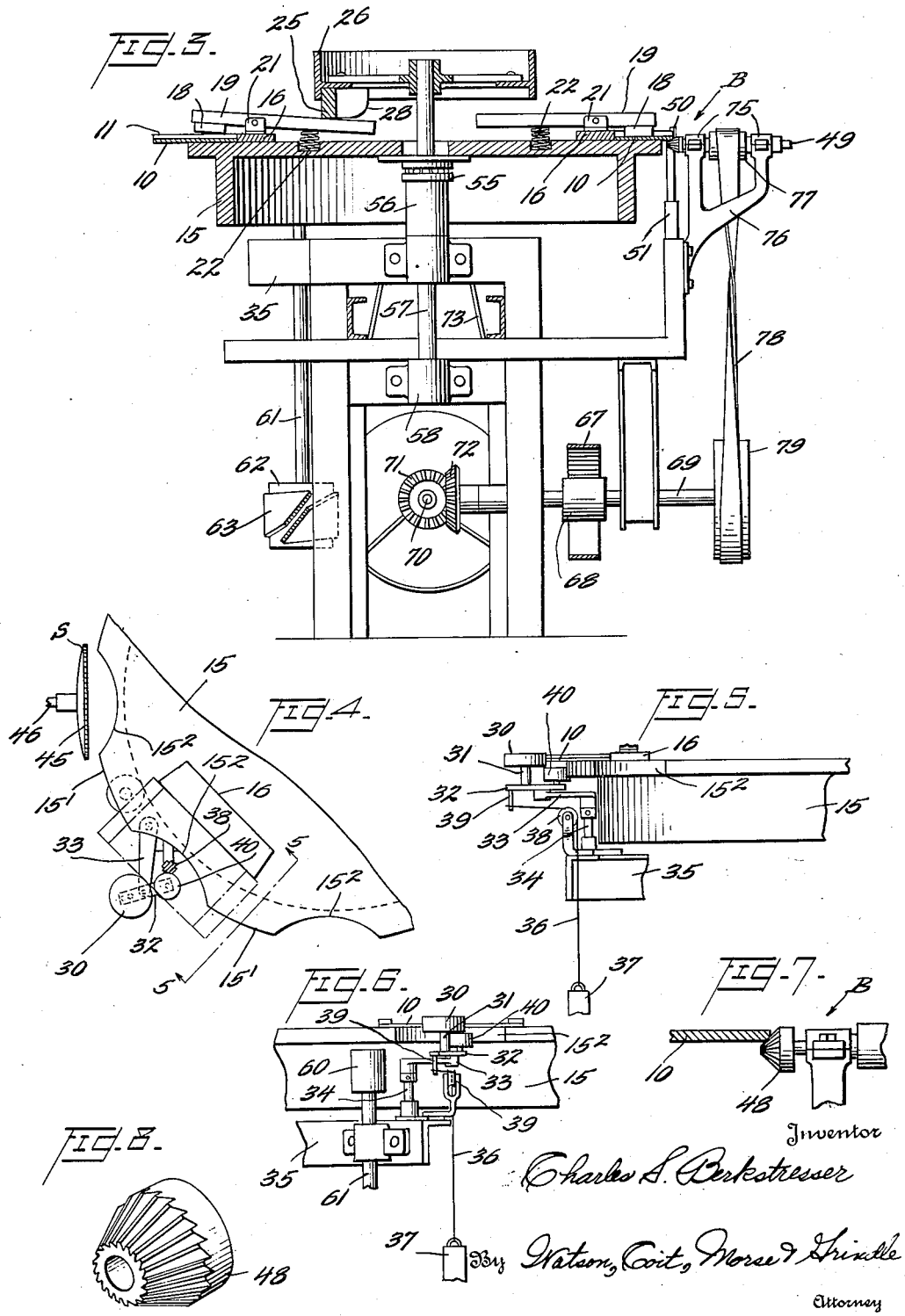

2,202,082

UNITED STATES PATENT OFFICE 2,202,082

APPARATUS FOR MAKING CONTAINERS

Charles S. Berkstresser, Lacoochee, Fla., assignor to Cummer Sons Cypress Company, Jacksonville, Fla., a corporation of Florida Application October 4, 1937, Serial No. 167,290

2 Claims. (Cl. 144—154)

This invention relates to apparatus for and methods of making containers or crates and particularly to improvements in methods of, and apparatus for, fabricating the side members of lightweight wooden crates or containers of the type now made use of in the packaging and transportation of fruits and vegetables.

For some time past the preferred type of container made use of in the packaging shipment and storage of fruits and vegetables, particularly tomatoes, citrus fruits and the like, has comprised an elongated wooden box, rectangular in longitudinal and transverse section, and comprising rectangular bottom, top, end and side members suitably fastened together. For some time also a method of packing has been employed commonly designated the "bulge" method of packing, in accordance with which method fruit or vegetables are placed in the crate or container in such manner that at least the uppermost layer of fruit or vegetables is upwardly arched longitudinally of the crate or container, necessitating the arching of the container top which is, of course, secured in position after the container has been fully packed. A further step in the improvement of containers of the bulge pack type has been the upward arching of the side members of the container to substantially the same extent as the contents, the upper edge of each side curving upwardly from the end members toward a central point, the segmental upward extensions of the sides laterally supporting and protecting the upwardly bulging portion of the fruit pack. This type of container, with its upwardly curved side members, has become increasingly popular and in accordance with the present invention an improved method of and apparatus for quickly and economically fabricating such side members is provided.

It will be appreciated by those skilled in the art that, while all containers which are made use of in the shipment of perishable fruits and vegetables must be mechanically strong and should be attractive in appearance, the cost of manufacture must be minimized. The present invention provides a method of and apparatus for rapidly and economically fabricating crate side members of the novel type above mentioned, to the end that the entire crate or container embodying the novel sides may be produced at a cost which is little, if at all, greater than the cost of producing the long used, conventional, rectangular crate side.

One form of the novel apparatus is illustrated in the accompanying drawings and will be hereinafter described in detail. It will be appreciated that the apparatus disclosed, and the method hereinafter described, may be modified in minor respects in adapting the invention to the manufacture of crate sides of different sizes and intended to be used for the packaging of different kinds of fruits and vegetables, without departure from the essentials of the invention.

In the drawings:

Figure 1 is a plan view of the apparatus;

Figure 2 is a side elevation of the same;

Figure 3 is a section on the line 3—3 of Figure 2;

Figure 4 is a plan view, partially broken away, of a portion of the apparatus;

Figure 5 is a section on line 5—5 of Figure 4;

Figure 6 is a side elevation of the portion of the apparatus shown in plan in Figure 4;

Figure 7 is a section on line 7—7 of Figure 1;

Figure 8 is a perspective view of one of the cutting elements included in the apparatus;

Figure 9 is a side elevation of one of the completed container sides, also showing in dotted lines a portion of the original blank from which the container is fabricated;

Figure 10 is an end elevation of a completed container side.

Upon referring first to Figures 9 and 10 it will be perceived that the container or crate side which it is the object of the invention to produce comprises essentially a thin flat wooden member indicated at 10, preferably comprising a sheet of veneer, with the grain running longitudinally as shown, battens 11 being secured to member 10 at the ends thereof, and the upper edge of the veneer sheet member 10 being bevelled upon the side remote from the battens, as indicated at 12 in Figure 10. In the production of the container side shown in full lines, a rectangular blank is first fabricated upon any suitable type of box side making machine, such as the blank shown in full and dotted lines in Figure 9. It is the purpose of the present invention to provide a machine for severing from that portion of the original blank, which is shown in full lines, the portion thereof which is shown in dotted lines, leaving the upper edge of the finished side, which edge is indicated at 13, smoothly curved or arched from the battens 11 to the midpoint thereof, and also for bevelling this upper edge upon the side thereof which is to ultimately engage the fruit placed in the completed container, as indicated by the numeral 12. That portion of the original rectangular blank which is indicated in dotted lines in Figure 9 becomes waste and is discarded. The principal cutting elements of the mechanism to be described comprise a saw for severing the originally rectangular blank along the line 13 (Figure 9) and a bevelling tool for removing one of the sharp corners formed as a result of this cutting operation.

The major moving element of the mechanism comprises a table 15, generally circular in plan, horizontally disposed and mounted for rotation about a fixed vertical axis. Upon this table are successively placed the rectangular side members to be acted upon, the table is revolved so that these members are presented one after the other to a saw or the like, generally indicated at S, for severing from the blank that portion shown in dotted lines in Figure 9, and leaving the upper edge curved, as indicated at 13, and to the bevelling mechanism, which is generally indicated at B, for removing one corner of the curved edge which has just been formed, after which the completed container side is removed from the table.

The table which is illustrated by way of example is adapted to receive and to simultaneously hold eight container sides, each container side being placed horizontally upon the upper surface of the table with one longitudinal margin projecting over the outer edge of the table, and is firmly clamped in such position during the sawing and bevelling operations. When so disposed the inner edge of each container side rests against an elongated stop member 16 secured to the table top and its end edges rest against and are confined by stop members 17, also secured to the table top, one such member serving as a stop or abutment for each two adjacent container sides. The means for confining each container side against movement includes a device for cooperating with the table top in clamping such side. Each such device includes a pressure plate or block 18 adapted to contact with the uppermost surface of the flat member 10 of the container side intermediate the battens 11, this pressure plate being rigidly attached to the end of a clamping lever, indicated at 19. This clamping lever is mounted for rocking movement about the horizontal axis indicated by the dotted line 20, a horizontally disposed bar or bolt extending through a transverse recess in clamping lever 19 having its ends rigidly mounted in brackets 21 secured to the upper surface of the elongated stop 16. Each clamping lever 19 is normally urged in an operative direction by resilient means, such for instance as by a spring 22 the upper end of which bears against the under-surface of the clamping lever inwardly of its pivotal axis and the lower end of which is seated in a recess formed in the table top.

Rocking movements of the clamping members, into and out of container side engaging position, are effected automatically in timed relation to the rotational movement of the table. The means for effecting such movements comprises a stationary cam 25, secured to a stationary cam support 26, the cam extending along the arc of a circle centered upon the axis of rotation of the table top, as indicated in dotted lines in Figure 1, from a point indicated by the numeral 27 to a point indicated by the numeral 28, the point 27 being the leading edge of the cam, or the portion thereof which first comes in contact with the clamping levers 19, and the numeral 28 indicating the terminal edge of the cam, at which point the clamping levers leave the cam, it being understood that the table rotates during the operation of the apparatus in the direction indicated by the arrow X in Figure 1. It will be understood, therefore, that the cam 25 is successively engaged by each clamping lever 19, as the table rotates, at approximately the point indicated by the numeral 27, whereupon the container side which has been securely held by said clamping member is released thereby, and may be freely removed by an operator. During the travel of the clamping member which has just been lifted between the points indicated by the numerals 27 and 28, or so long as the end of that clamping member remains in contact with cam 25, the clamping plate 18 remains substantially elevated above the surface of the table and a fresh or uncut container side may be inserted thereunder. Just as soon as the end of the cam 25 is disengaged by any clamping lever, the associated spring 22 becomes active, the clamping plate 18 descends, and the blank is engaged. In order to make certain that each newly inserted blank is properly positioned against a stop 16, and hence that it projects radially outward the desired distance, means is provided for acting upon its outer edge just before the adjacent clamping plate 18 descends. This means is shown most clearly in Figures 4, 5 and 6 and comprises essentially a roller 30 which is adapted to bear against the outer edge of a container side passing the same, and mechanism for causing this roller to automatically move into operative position, and to operate to thrust any blank which it engages radially inward against stop 16, should the blank not be properly seated.

It will be seen that the roller 30 is rotatably mounted upon a vertically extending spindle 31 the lower end of which is rigidly secured to a member 32 which is in turn fixed upon the outer end of an arm 33 rotatably mounted upon the upper end of a vertically disposed stationary bracket member 34 secured to the frame member 35. To member 32 there is attached, by means of a cord 36, a weight 37, the cord 36 passing over a stationary pulley 38 mounted upon the frame and having its upper end attached to a pin 39 rigid with member 32. The action of weight 37 is therefore to constantly tend to move the roller 30 inwardly toward the axis of rotation of the table and to successively engage the outer edges of successively passing container sides and to thrust these sides inwardly against the respective stop members 16. Inasmuch as the weight 37 constantly acts and would tend to draw the roller 30 inwardly into the space between the adjacent ends of two adjacent container sides after any container side has moved past the roller, means is provided for automatically controlling the movements of roller 30.

This means includes a roller 40 mounted for rotation upon the inner end of member 32, which roller is positioned to engage the edge of the table top, as indicated in Figures 5 and 6. The table top edge has a number of portions, indicated at 15', which are truly concentric with its axis of rotation and a number of alternate portions $15^2$ which are concave. While a portion 15' of the table top is passing the roller 30, it will be engaged by the roller 40 and as a result the roller 30 is held outwardly of the edge of the table a sufficient distance to permit the passage thereby of the leading corner of an oncoming container side. As soon, however, as the concentric edge 15' of the table top disengages roller 40, the weight becomes active to draw rollers 30 and 40 toward the table, the roller 40 being wholly disengaged from the table top and the roller 30 therefore engaging the outer edge of the container side and functioning as aforesaid to press this side tightly against its backing stop 16. The operation of this mechanism is therefore wholly automatic and it functions just prior to the engagement of the container side passing the same by clamping plate 18 of the associated clamping lever so that it is certain that, when the clamping plate 18 engages the side, the side will be in proper position.

After having been thus properly positioned and clamped rotation of the table carriers the leading end of the thus clamped container side into contact with the rotating toothed edge of circular saw 45. This saw 45 is affixed to the end of a horizontally disposed motor driven spindle 46, directly connected to the shaft of the electric motor 47 whereby the saw may be rotated at the desired speed. The saw is concave and its concave surface is centered about the axis of rotation of the table top so that, as each container side is moved past the saw by the rotation of the table, it is cut by the saw along a curved line such as indicated at 13 in Figure 9, and that portion of the blank beyond this line falls and is discarded.

After passage of each blank past the saw 45, its curved outer edge is subjected to the action of the conical cutting tool or bevelling device 48. This generally conical cutting head is mounted for rotation about a horizontal axis, upon a spindle 49, and the teeth of the cutting head, which are flat topped as indicated clearly in Figure 8, engage and remove the lower corner of the outer curved edge of the container side. It will be seen that the bevelling cutter 48 must necessarily act in part with the grain of the wood along the edge 13 and in part against the grain of the wood, since the flat sheet member 10 of the side has its grain extending in the directions shown in Figure 9. A cutter having teeth of the type shown in Figure 8, however, will form a smooth bevel along the curved edge of the container side despite the fact that, for nearly one half of its travel, it is acting against the grain of the wood. This is an important feature of the invention. During the time that the bevelling head 48 is acting upon the outer edge of each container, the end of a spring blade 50 presses against this edge to prevent radially outward movement of the container side being acted upon, this spring blade being mounted upon an upright member 51 the lower end of which is attached to the supporting frame of the machine.

Each blank, after having been acted upon by the sawing and bevelling instrumentalities, is ready for removal and, as soon as the clamping plate 16, resting upon the same, has been raised through the coaction of the clamping lever and cam 25, it may be removed by an attendant and a fresh uncut container side inserted in its place.

The details of the frame of the machine are of no special importance and may be modified substantially if desired. Likewise the mechanism for driving the various operating parts of the machine may be varied considerably. I have found, however, that the mechanism shown in the drawings for driving the several operating parts operates with great efficiency. Preferably the table 15 is centrally mounted upon the frame and a ball bearing 55 interposed between the table and its supporting element, such for instance as the stationary tubular sleeve 56. The stationary cam support 26 may advantageously be mounted upon a central shaft 57 extending through the tubular member or sleeve 56, and is anchored to the frame at its lower end by means of a bracket 58. The power for operating the saw 45, the bevelling head 48, and for rotating the table, may be advantageously taken from the motor 47 through a simple arrangement of belts and pulleys. I prefer to drive the table 15 frictionally, and to this end have provided the table with a depending skirt, as shown in Figures 2 and 3, which skirt has a cylindrical outer surface concentric with the axis of rotation of the table, a cylindrical frictional driving element 60 resting against the outer surface of this skirt. Should rotation of the table be prevented by jamming of the saw or bevelling head the driving member 60 will slip and no damage result. Friction head 60 is mounted upon the upper end of a vertically disposed rotatable shaft 61, suitably supported upon the frame and upon the lower end of this shaft is fixed a pulley 62. Pulley 62 is operatively connected by means of a belt 63 with a pulley 64 mounted upon the horizontally disposed shaft 65. Shaft 65 in turn has a pulley or drum 66 fixed thereon which is operatively connected by means of a belt 67 with a pulley 68 fixed on shaft 69. Shaft 69 is operatively connected to shaft 70 through bevel gears 71 and 72 and shaft 70 is connected by means of suitable pulleys and the belt 73 with the motor driven spindle 46 so that it follows that the friction head 60 is driven by power derived from the motor 47 although at a very considerably less speed due to the speed reducing effects of the conections just described.

The cutting head 48 is, as previously mentioned, mounted upon the end of a horizontally disposed spindle 49 and spindle 49 is mounted in bearings 75 supported upon the upwardly extending arms of a bracket 76 rigid with the frame of the machine. Intermediate the spindle supporting bearings 75 is a pulley 77 fixed on shaft 49 and this pulley is connected by means of a belt 78 and pulley 79 with the shaft 69 previously mentioned. Hence the cutting head 48 is likewise driven from the motor 47. The driving connections between the power source, the rotating table and the cutting instrumentalities may be substantially varied but those shown have been found to operate efficiently and may be advantageously employed.

Having thus described the invention, what is claimed as new and desired to be secured by Letters Patent is:

1. Apparatus for fabricating wooden container sides comprising a table mounted for rotation about a fixed axis and having a circular series of work holding pockets equidistantly spaced from said axis, means for continuously rotating said table, a roller movable radially of the table and adapted successively to engage and roll on the outer edges of successive container sides as the latter pass by said roller, means for normally urging said roller toward the table, work clamping mechanism for holding said sides in said pockets, each side being clamped thereby immediately after it has been radially positioned by said roller, and means for intermittently and positively moving said roller outwardly.

2. Apparatus for fabricating wooden container sides comprising a table mounted for rotation about a fixed axis and having a circular series of work holding pockets equidistantly spaced from said axis, means for continuously rotating said table, a roller movable radially of the table and adapted successively to engage and roll on the outer edges of successive container sides as the latter pass by said roller, means for normally urging said roller toward the table, work clamping mechanism for holding said sides in said pockets, each side being clamped thereby immediately after it has been radially positioned by said roller, and means for intermittently and positively moving said roller outwardly, said last means comprising a series of cam surfaces formed on the edge of said table.

CHARLES S. BERKSTRESSER.